(12) United States Patent
Cuch et al.

(10) Patent No.: US 8,754,007 B2
(45) Date of Patent: Jun. 17, 2014

(54) MULTI-LAYER SHEET MATERIAL

(75) Inventors: Simon R. Cuch, East Longmeadow, MA (US); Mayurkumar Patel, East Longmeadow, MA (US); Hidenori Yada, Tokyo (JP)

(73) Assignee: Kanzaki Specialty Papers, Inc., Ware, MA (US)

( * ) Notice: Subject to any disclaimer, the term of this patent is extended or adjusted under 35 U.S.C. 154(b) by 1169 days.

(21) Appl. No.: 12/617,886

(22) Filed: Nov. 13, 2009

(65) Prior Publication Data

US 2010/0125499 A1 May 20, 2010

Related U.S. Application Data

(60) Provisional application No. 61/114,701, filed on Nov. 14, 2008.

(51) Int. Cl.
*B41M 5/30* (2006.01)
*B41M 5/42* (2006.01)
*B41M 5/50* (2006.01)

(52) U.S. Cl.
USPC ............................................. 503/226

(58) Field of Classification Search
USPC ................................. 503/200–226
See application file for complete search history.

(56) References Cited

U.S. PATENT DOCUMENTS

| | | | |
|---|---|---|---|
| 5,338,066 A * | 8/1994 | Gundjian | 283/67 |
| 5,748,204 A | 5/1998 | Harrison | |
| 6,114,047 A | 9/2000 | Ohta | |
| 6,190,781 B1 * | 2/2001 | Tsubaki et al. | 428/32.21 |
| 6,677,273 B2 * | 1/2004 | Torii et al. | 503/201 |
| 7,094,732 B2 * | 8/2006 | Finger | 503/200 |
| 7,223,522 B2 | 5/2007 | Sampei | |
| 2002/0058194 A1 | 5/2002 | Williams et al. | |
| 2005/0011384 A1 | 1/2005 | Sampei | |
| 2006/0159871 A1 | 7/2006 | Agrawal et al. | |
| 2007/0211132 A1 | 9/2007 | Lyons et al. | |
| 2007/0211134 A1 | 9/2007 | VanDemark | |
| 2007/0212146 A1 | 9/2007 | Lyons et al. | |
| 2007/0243396 A1 | 10/2007 | Buchbinder et al. | |
| 2008/0103041 A1 | 5/2008 | Iida et al. | |
| 2008/0113126 A1 | 5/2008 | Anderson et al. | |

FOREIGN PATENT DOCUMENTS

| | | |
|---|---|---|
| DE | 19958095 | 6/2000 |
| JP | 07089236 | 4/1995 |
| JP | 2003231357 | 8/2003 |
| JP | 2003276337 | 9/2003 |
| WO | WO 9928791 | 6/1999 |
| WO | WO 2004/030922 | 4/2004 |
| WO | WO 2004114015 | 12/2004 |

* cited by examiner

*Primary Examiner* — Bruce H Hess
(74) *Attorney, Agent, or Firm* — Holland & Bonzagni, P.C.; Mary R. Bonzagni, Esq.

(57) ABSTRACT

A multi-layer sheet material imageable by both direct thermal printing devices and digital offset printing presses (e.g., Hewlett-Packard (HP) Indigo digital offset printing presses), is provided. In one contemplated embodiment, the inventive sheet material demonstrates good ink/media adhesion when imaged using HP Indigo presses, and is comparable or superior to standard direct thermal grades in terms of printability and durability. Where HP Indigo and direct thermal are on demand printing devices, the present invention makes it possible to have a production line where both are in operation at various process steps.

4 Claims, 3 Drawing Sheets

HP Indigo Receptive Layer

MULTI-LAYER SHEET MATERIAL

RELATED APPLICATION

This application claims priority to U.S. Provisional Patent Application Ser. No. 61/114,701, filed Nov. 14, 2008, which is incorporated herein in its entirety by reference.

TECHNICAL FIELD

The present invention generally relates to a multi-layer sheet material, and more particularly relates to a multi-layer sheet material imageable by both direct thermal printing devices and digital offset printing presses (e.g., Hewlett-Packard (HP) Indigo digital offset printing presses).

BACKGROUND AND SUMMARY OF THE INVENTION

Direct thermal media are oftentimes pre-printed with color, graphics, company logos, and the like, using offset or flexographic imaging processes prior to being imaged using direct thermal printing devices.

Digital offset printing presses such as HP Indigo presses offer an alternative imaging means, delivering very high image quality and very quick press set times. In fact, considering offset or flexographic and HP Indigo imaging processes, HP Indigo imaging is the method of choice for short printing runs.

In view of the above, a need exists for direct thermal media capable of being imaged by HP Indigo presses.

The present invention satisfies this need by providing a sheet material that can be imaged by both a direct thermal printing device and a digital offset printing press such as an HP Indigo printing press. The inventive sheet material, which may also be imaged using water-based flexography or flexo inks and oil-based offset inks, basically comprises a base substrate, one or more thermal layers, and one or more layers receptive to inks used in digital offset printing presses.

In a preferred embodiment, the inventive sheet material comprises (in the order specified):
  (1) a base substrate;
  (2) optionally, one or more undercoat layers;
  (3) one or more thermal layers;
  (4) optionally, one or more overcoat layers; and
  (5) one or more layers receptive to inks used in digital offset printing presses.

Contemplated embodiments include a two layer system comprising a base substrate, a thermal layer, and a digital offset ink receptive layer (preferably, a layer receptive to inks used in HP Indigo digital offset printing presses (hereinafter, an HP Indigo receptive layer)), a three layer system that demonstrates greatly improved plasticizer resistance and comprises a base substrate, a thermal layer, a thermal overcoat layer, and a digital offset ink receptive layer (preferably, an HP Indigo receptive layer), and a four layer system comprising a base substrate, a thermal undercoat layer, a thermal layer, a thermal overcoat layer, and a digital offset ink receptive layer (preferably, an HP Indigo receptive layer).

The base substrate and overlying layers in one embodiment of the inventive sheet material are clear or fairly translucent, thereby allowing for images to be viewed from the substrate side of the sheet material.

The present invention further provides a method for increasing the counterfeit-resistance of a sheet material, the method comprising providing a sheet material having imageable coatings, as described above, and printing one or more security features (e.g., letters, numbers, alphanumeric codes, barcodes, micro-text, digital watermarks, and the like) on one surface of the sheet material using a digital offset printing press (preferably, an HP Indigo printing press) and/or a direct thermal printing device.

In a preferred embodiment, the inventive method comprises printing a first security feature on one surface of the sheet material using a digital offset printing press (preferably, an HP Indigo printing press), and printing a second security feature on the same or opposing surface of the sheet material using a direct thermal printing device. Printing may be performed by one or more variable data printing devices.

The present invention also provides a secure sheet material, which comprises one or more printed security features, wherein the one or more security features are printed using a digital offset printing press (preferably, an HP Indigo printing press) and/or a direct thermal printing device. Series of such secure sheet materials may be prepared from a single print run using a variable data printing device, with the printed sheet materials each having a different printed security feature.

In a preferred embodiment, the secure sheet material comprises two or more printed security features, wherein a first security feature is printed on one surface of the sheet material using a digital offset printing press (preferably, an HP Indigo printing press), and a second security feature is printed on the same or opposing surface of the sheet material using a direct thermal printing device.

Also provided by way of the present invention is a computer-implemented method for assessing the ability of a print advertising campaign to generate new business, the method comprising:
  collecting information printed on advertising materials used in a print advertising campaign including the names and addresses of each recipient or intended recipient thereof, wherein the advertising materials are prepared from the above-described sheet materials, wherein the information is printed using a direct thermal printing device and a digital offset printing press (preferably, an HP Indigo printing press), and wherein the advertising materials direct each recipient to a web address or URL and/or provides each recipient with a contact number;
  storing the collected information in a database;
  recording each time a recipient of the advertising material visits the web address or URL or calls the contact number to request additional information or to order advertised goods or services;
  storing the recorded information in the database; and
  displaying the information stored in the database in a form that enables a viewer to assess the ability of a print advertising campaign to generate new business.

The present invention further provides a print advertising campaign assessment system, which comprises:
  a computer having a memory device;
  a database stored in the memory device, the database containing information printed on advertising materials from a print advertising campaign including the name and address of each recipient or intended recipient of the advertising materials, wherein the advertising materials are prepared from the above-described sheet materials; and
  an internet connection operably connecting the computer to one or more communication systems accessible by the recipients of the print advertising materials,
  wherein the computer is operable to collect, record, store and process information from the advertising materials and from the recipients including requests by the recipients for additional information and orders for advertised goods or services; and wherein the computer is operable to display the information stored in the database in a form that enables a viewer to assess the ability of a print advertising campaign to generate new business.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs.

All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings, in which.

BEST MODE FOR CARRYING OUT THE INVENTION

The multi-layer sheet material of the present invention is characterized by its ability to be imaged using both direct thermal printing devices and digital offset printing presses (e.g., HP Indigo printing presses). In one contemplated embodiment, the inventive sheet material demonstrates good ink/media adhesion when imaged using HP Indigo presses, and is comparable or superior to standard direct thermal grades in terms of printability and durability. Where HP Indigo and direct thermal are on demand printing devices; the present invention makes it possible to have a production line where both are in operation at various process steps.

Figure 1:
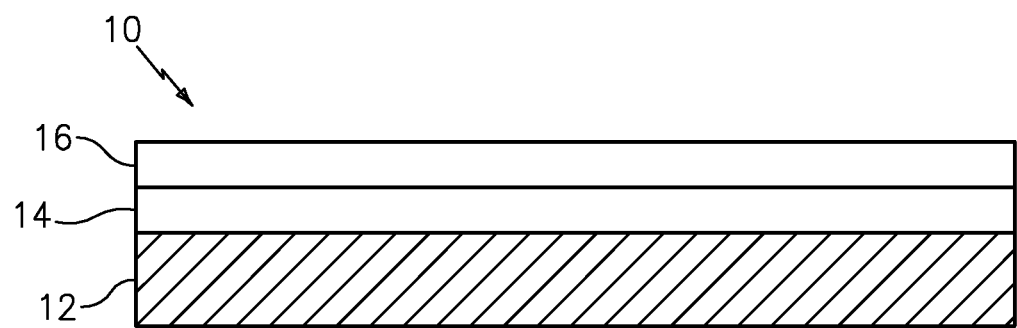
FIG. 1 is an enlarged, cross-sectional, side view of one embodiment of the multi-layer sheet material of the present invention in the form of a two-layer system.

Referring now to FIG. 1 of the drawings, reference number 10 is used to denote an embodiment of the multi-layer sheet material of the present invention. The inventive sheet material 10 comprises: a base substrate 12; a thermal layer 14; and an HP Indigo receptive layer 16.

Base substrate 12 is an opaque, translucent, or clear base substrate. Contemplated base substrates include optionally coated paper or paper-like substrates prepared from any suitable natural and/or synthetic fiber. Also contemplated are plastic base substrates including light transmissive substrates prepared from moldable, thermoformable and/or extrudable materials such as acrylic, polyacrylonitrile, polycarbonate, polydicyclopentadiene, polyethylene, polyethylene terephthalate (PET), polypropylene, polystyrene, polyvinyl chloride, mixtures and copolymers thereof, and the like.

Base substrate 12, which may be made of one layer or multiple layers of substrate material(s), has a preferred thickness of from about 3 to about 500 microns (more preferred, from about 10 to about 250 microns), a preferred basis weight of from about 3 to about 800 grams per square meter ($g/m^2$) (more preferred, from about 10 to about 400 $g/m^2$), and a preferred surface smoothness of at least about 20 Bekk seconds.

Adhesion of the base substrate 12 to an overlying layer may be promoted by using one or more adhesive coatings, or by treating a surface of base substrate 12 with, for example, a corona discharge treatment, glow discharge treatment, flame treatment, or ultraviolet (UV) treatment.

Thermal layer 14 may be prepared from aqueous coating formulations made up of known leuco dyes, developers, binders (e.g., a blend of styrene butadiene, acrylic and polyvinyl alcohol binders), and optionally, additives such as antiblocking agents, antistatic agents, crosslinking agents, defoaming agents, fluorescent whitening agents, light stabilizers, lubricants (e.g., fatty acid salts such as zinc stearate), pigments, rheology modifiers, sensitizers, surfactants, UV absorbers, waxes, wetting agents, and the like. Examples of such may be found in US 2008/0103041 A1 to Iida et al., which is incorporated herein by reference.

In a preferred embodiment, thermal layer 14 is prepared from an aqueous coating formulation comprising: a leuco dye having an average particle size ranging from about 0.1 to about 5.0 microns, a developer having an average particle size ranging from about 0.1 to about 5.0 microns, a binder, and one or more additives selected from the group of crosslinking agents, defoamers, fluorescent whitening agents, rheology modifiers, surfactants and wetting agents. The ratio of developer to leuco dye in the aqueous coating formulation ranges from about 5:1 to about 1:2 (preferably, from about 3:1 to about 1:1), with the binder being present in an amount ranging from about 5 to about 80% by dry weight, based on the total dry solids of the aqueous coating formulation.

In a more preferred embodiment, the aqueous coating formulation used to prepare thermal layer 14 further comprises one or more sensitizers having an average particle size ranging from about 0.1 to about 5.0 microns to optimize thermal sensitivity performance, as well as antiblocking agents, antistatic agents, light stabilizers, lubricants and UV absorbers. The ratio of sensitizer to developer in the aqueous coating formulation ranges from about 10:1 to about 1:10 (preferably, from about 5:1 to about 1:5).

Thermal layer 14 may also be prepared from a formulation devoid of leuco dyes. In one such contemplated embodiment, thermal layer 14 is a fairly opaque (preferably white opaque) layer that becomes clear in areas exposed to direct thermal energy or to a threshold temperature condition, and is prepared from an aqueous coating formulation comprising one or more heat sensitive materials (e.g., developers, sensitizers, synthetic/plastic pigments) that undergo a phase change upon exposure to heat, and optionally one or more binders and additives (as described above). For those formulations that contain one or more binders, the ratio of heat sensitive material to binder ranges from about 99:1 to about 1:20.

The aqueous coating formulations described above may be applied to a surface of base substrate 12 using e.g., air knife coaters, rod coaters, gravure coaters, or blade coaters, so as to achieve a preferred average coat weight that ranges from about 1 to about 15 g/m², based on the total dry weight of the coating formulation. Drying can be accomplished by any known method or technique including room temperature air drying, hot air drying, heating surface-contact drying or heat radiation drying.

Figure 3:
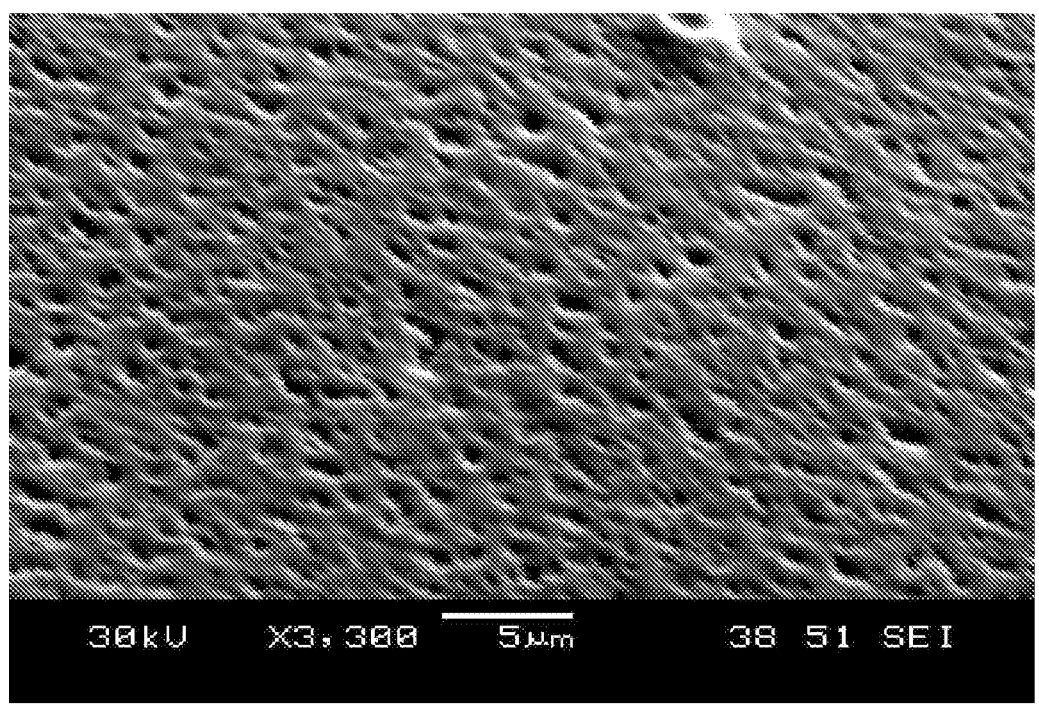
FIG. 3 is a SEM photomicrograph (3300× magnification) of the HP Indigo receptive layer of one embodiment of the multi-layer sheet material of the present invention, taken with a JEOL scanning electron microscope, model number JSM-6060LV.

HP Indigo receptive layer 16 is a porous layer (see SEM photomicrograph of HP Indigo receptive layer 16 shown in FIG. 3), has a high surface strength, a high degree of affinity for digital offset inks such as HP Indigo inks and demonstrates compatibility with digital offset (e.g., HP Indigo) press components (e.g., blanket) that directly contact target media. HP Indigo receptive layer 16 may be prepared from an aqueous coating formulation made up of pigments or particles (e.g., organic and inorganic particles made up of (or comprising) acrylic resins, alumina, amorphous and colloidal silicas); one or more binders (e.g., water soluble or emulsion film forming polymers comprising acrylic resins, polyurethanes, urethane/acrylic copolymers, ethylene/acrylic acid copolymers, hydroxypropyl methyl cellulose, polyvinyl alcohol and modified polyvinyl alcohol); and optionally, one or more additives selected from the group of crosslinking agents, defoaming agents, dispersing agents, fluorescent whitening agents, light stabilizers, lubricants (e.g., zinc stearate), surfactants, rheology modifiers, UV absorbers, waxes and wetting agents.

In a preferred embodiment, HP Indigo receptive layer 16 is prepared from an aqueous coating formulation comprising: inorganic particles having an average particle size ranging from about 5 to about 500 nanometers (nm); one or more film forming binders (e.g., ethylene/acrylic acid copolymers); and optionally, one or more additives (as described above), wherein the dry weight ratio of inorganic particles to film forming binder(s) ranges from about 15:1 to about 1:1.

The aqueous coating formulation described above may be applied to a surface of coated base substrate 12 as described above so as to achieve a preferred average coat weight that ranges from about 0.5 to about 5 g/m², based on the total dry weight of the coating formulation. Drying, as described above, can be accomplished by any known method or technique including room temperature air drying, hot air drying, heating surface-contact drying or heat radiation drying.

The coat weight ratio between thermal layer 14 and HP Indigo receptive layer 16 ranges from about 1:5 to about 30:1, and preferably ranges from about 1:1 to about 5:1.

As noted above, the inventive sheet material 10 may be imaged by direct thermal printing devices, digital offset printing presses (e.g., HP Indigo presses), as well as water-based flexography or flexo inks and oil-based offset inks. As will be readily appreciated by those skilled in the art, such a combination of imaging techniques greatly increases the number of imaging effects made possible by the present inventive sheet material 10.

The use of thermal overcoat and undercoat layers are also contemplated by way of the present invention.

Figure 2:
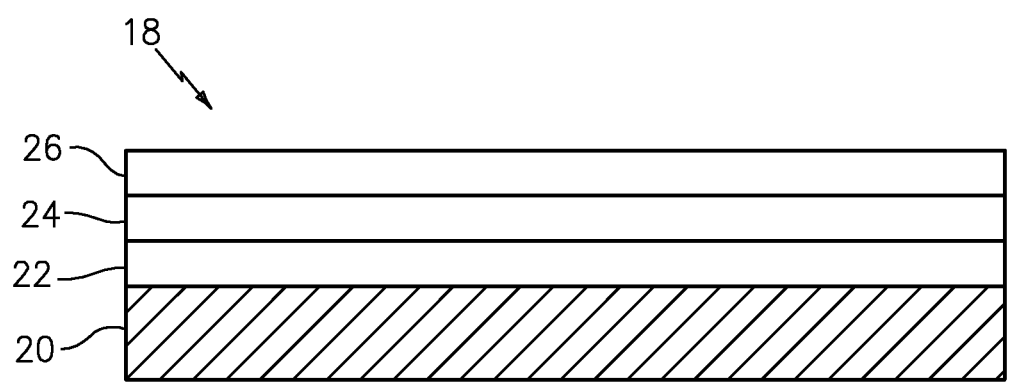
FIG. 2 is an enlarged, cross-sectional, side view of another embodiment of the inventive multi-layer sheet material in the form of a three-layer system.

A three layer system 18, which comprises a base substrate 20 with the following overlying layers: thermal layer 22; thermal overcoat layer 24; and HP Indigo receptive layer 26, is depicted in FIG. 2.

The thermal overcoat layer 24 minimizes head residue, improves durability and imaging performance, and demonstrates very good adhesion to overlying and underlying layers. As shown in FIG. 2, thermal overcoat layer 24 generally comprises one or more water soluble polymers or resins (e.g., acrylic, urethane resins, urethane/acrylic copolymers, polyvinyl alcohol, modified polyvinyl alcohol, starch), and optionally organic or inorganic pigments (e.g., calcium carbonate, kaolin, silica, alumina, etc.) and other additives (e.g., crosslinking agents, defoaming agents, dispersing agents, light stabilizers, lubricants (e.g., zinc stearate), surface tension additives, surfactants, UV absorbers, waxes (e.g., polyethylene waxes) and wetting agents). Where the one or more thermal overcoat layers are not outermost layers, the above components may not be present in quantities deemed optimal to meet the property requirements of an outermost thermal overcoat layer, namely, minimal sticking and/or printhead residue.

In a preferred embodiment, the thermal overcoat layer 24 is prepared from an aqueous coating formulation comprising: a blend of modified polyvinyl alcohol and urethane resins and/or urethane/acrylic copolymers; inorganic pigments; and one or more additives, as described above, including from about 0.2 to about 5% by dry weight (based on the total dry weight of the coating formulation) of a crosslinking agent(s), a defoamer(s) and a surfactant(s), from about 2 to about 14% by dry weight (based on the total dry weight of the coating formulation) of lubricants (e.g., zinc stearate) and wax(es) and, wherein the ratio of resin to pigment ranges from about 5:1 to about 1:3.

The aqueous coating formulation described above may be applied to a is surface of thermal layer 22 so as to achieve a preferred average coat weight that ranges from about 1 to about 5 g/m², based on the total dry weight of the coating formulation. Drying, as described above, can be accomplished by any known method or technique including room temperature air drying, hot air drying, heating surface-contact drying or heat radiation drying.

The coat weight ratio between thermal layer 22 and thermal overcoat layer 24 ranges from about 1:5 to about 15:1, and preferably ranges from about 1:1 to about 5:1, while the coat weight ratio between thermal overcoat layer 24 and HP Indigo receptive layer 26 ranges from about 1:5 to about 10:1, and preferably ranges from about 1:1 to about 5:1.

Preliminary durability testing on prior art direct thermal media and the two and three layer systems 10, 18, of the present invention, which were all imaged using a direct thermal printing device, revealed that the three layer system 18 exhibits greatly improved plasticizer resistance.

Test samples were obtained by first preparing a coating formulation for the thermal layer. The coating formulation was comprised of: a leuco dye having an average particle size ranging from about 0.2 to about 2.0 microns; a developer having an average particle size ranging from about 0.2 to about 2.0 microns; an amount equal to 21% by dry weight, based on the total dry weight of the coating formulation, of a blend of styrene butadiene, acrylic and polyvinyl alcohol binders; and the following additives, namely, crosslinking agents, defoamers, fluorescent whitening agents, surfactants and waxes. The ratio of developer to leuco dye in this coating formulation was 1.55:1, while the ratio of sensitizer to developer was 1.68:1. The coating formulation was applied to a film substrate at a rate of 3 g/m².

Test sample T2-A1 was prepared by applying a thermal overcoat layer to the above-described coated film substrate. The thermal overcoat layer was prepared from a formulation as described in paragraph [0036] above. The ratio of resin to pigment was about 1:1.4. The formulation was applied to the coated film substrate at a rate of 1.5 g/m². The resulting test sample consisted of the following layers in the order specified—[film substrate//thermal layer//thermal overcoat layer]:

Test sample T3-B1 was prepared as described above for test sample T2-A1, followed by the application of an HP Indigo receptive layer. The HP Indigo receptive layer was prepared from a formulation as described in paragraphs [0028] and [0029] above, with the binder comprising a blend of urethane/acrylic and ethylene/acrylic acid copolymers. The ratio of inorganic pigment to binder was about 2.3:1. The formulation was applied at a rate of 4.5 g/m². The resulting test sample consisted of the following layers in the order specified—[film substrate//thermal layer//thermal overcoat layer//HP Indigo receptive layer].

Test sample T2-A2 was prepared by applying an HP Indigo receptive, as described above, to the coated film substrate. The resulting test sample consisted of the following layers in the order specified—[film substrate//thermal layer//HP Indigo receptive layer].

Once prepared, the test samples were imaged using an Atlantek 400 printer (model number 400) at a setting of "medium energy . . . ten energy steps". The optical density of each image at each energy step was then measured using an X-Rite 530 spectrodensitometer (model number 530). The measured optical densities at each energy step are shown in the graphical depiction at FIG. 4A.

Each imaged test sample was then placed printed side up on a plastic container, wrapped three times using a clear stretch wrap film (RESINITE® plastic packaging film (RMF-61AH)) containing plasticizers, and placed in a dry oven at 40° C. for 15 hours. The optical density of each printed image was then remeasured. The remeasured optical densities at each energy step are shown in the graphical depiction at FIG. 4B.

Figure 4A:
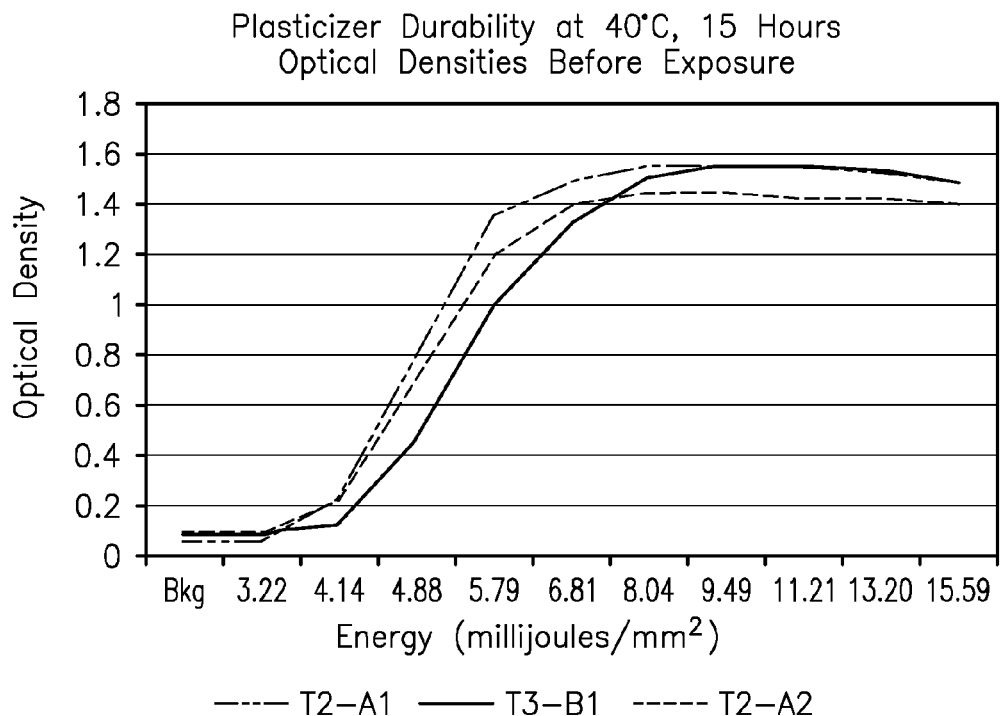
FIG. 4A is a graphical depiction of optical densities measured for images printed on three different test samples using a range of applied thermal energies.
Figure 4B:
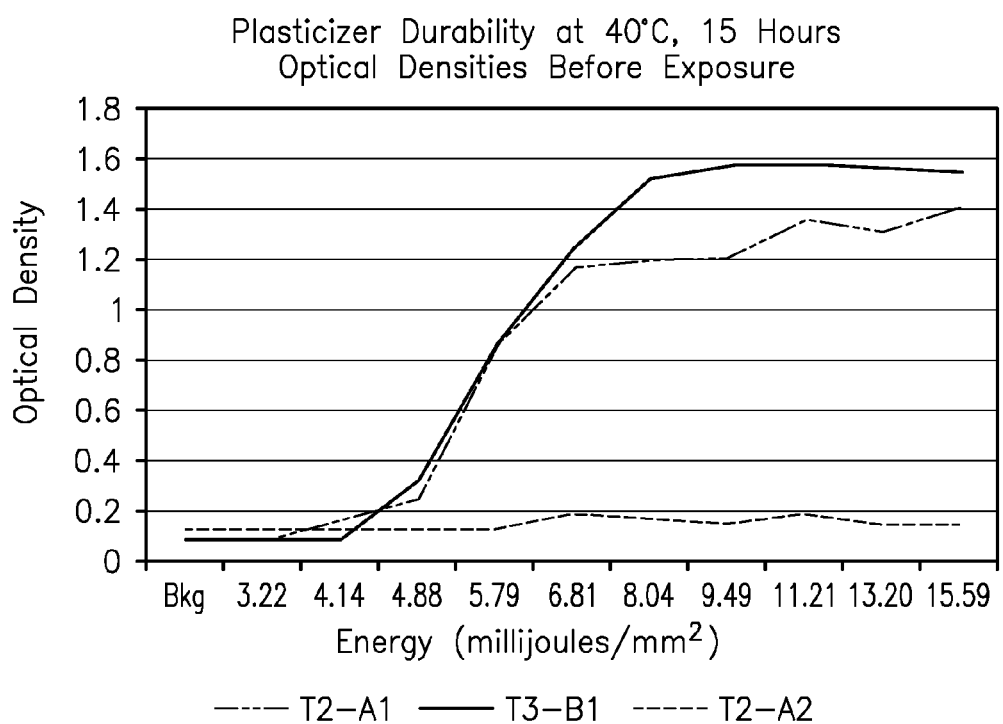
FIG. 4B is a graphical depiction of the optical densities measured for those images after exposing the test samples to plasticizers for 15 hours at 40° C.

As shown in FIGS. 4A and 4B, images formed on the three layer system 18 (T3-B1) of the present invention exhibited markedly superior plasticizer resistance as compared to those images formed on the prior art direct thermal media (T2-A1) and the two layer system 10 (T2-A2). The marked difference in retained optical densities between the images formed on the two and three layer systems 10 (T2-A2), 18 (T3-B1), suggests a synergistic effect between the thermal overcoat layer(s) 24 and the HP Indigo receptive layer(s) 26 in the three layer system 18 (T3-B1) in terms of plasticizer resistance.

A four layer system is also contemplated by way of the present invention, such a four layer system comprising a base substrate with the following overlying layers: thermal undercoat layer; thermal layer; thermal overcoat layer; and HP Indigo receptive layer.

The thermal undercoat layer is provided between the base substrate and the thermal layer for improving recording sensitivity and recording runnability. Such a layer, which demonstrates very good adhesion to overlying and underlying layers, may be prepared from an aqueous coating formulation made up of a binder and at least one of: organic hollow particles; thermal expansion particles; and oil absorbing pigments having an oil absorption of greater than or equal to 70 mL/100 g (preferably, from about 80 mL/100 g to about 150 mL/100 g). The oil absorption is determined in accordance with JIS K 5101-1991. Such undercoat layers are described in US 2008/0103041 A1 to lida et al., which is incorporated herein by reference.

In a preferred embodiment, the thermal undercoat layer is prepared from an aqueous coating formulation comprising: organic hollow particles; oil absorbing pigments; from about 5 to about 40% by dry weight (based on the total dry solids weight of the formulation) of one or more binders; and additives selected from the group of defoamers, fluorescent whitening agents, rheology modifiers and wetting agents, wherein the dry weight ratio of pigments to organic hollow particles ranges from about 10:1 to about 1:10.

The aqueous coating formulation described above may be applied to a surface of base substrate so as to achieve a preferred average coat weight that ranges from about 3 to about 20 g/m², based on the total dry weight of the coating formulation. Drying, as described above, can be accomplished by any known method or technique including room temperature air drying, hot air drying, heating surface-contact drying or heat radiation drying.

Coat weight ratios between the layers in this four layer system are as follows:

(A) thermal undercoat layer: thermal layer→from about 1:5 to about 20:1 (preferably, from about 1:3 to about 15:1);

(B) thermal layer: thermal overcoat layer→from about 1:5 to about 15.1 (preferably, from about 1:1 to about 5:1); and (C) thermal overcoat layer: HP Indigo receptive layer→from about 1:5 to about 10:1 (preferably, from about 1:1 to about 5:1).

As noted above, base substrate 12, 20, may be a clear or translucent substrate. In one such embodiment, overlying layers are also clear or translucent and applied HP Indigo, flexo, or offset inks have appreciable hiding power. Images printed with such inks (e.g., HP Indigo white ink) may be used as background (e.g., a white screen) for the thermal images to provide maximum contrast for better viewability. As the printed images are viewable from the substrate side of sheet material 10, 18, the substrate 12, 20 serves as another layer of protection against damage from, for example, casual handling. In a preferred embodiment, base substrate 12, 20 has a haze level of less than about 80, and a thickness ranging from about 3 to about 500 microns. Haze was measured according to ASTM D1003-07e1 using a BYK-Gardner GmbH Haze-Gard Plus haze meter.

In another such embodiment, thermal layer 14, 22, is a white layer that becomes clear upon exposure to heat. If the HP Indigo receptive layer 16, 26, is imaged with a black color, then when viewing the inventive sheet material 10, 18, through the base substrate 12, 20, a black image would appear in any area exposed to heat. Color may be added to this imaged sheet material by, for example, imaging a second HP Indigo receptive layer applied to the viewing side of the base substrate 12, 20.

Images may also be printed on the inventive sheet materials having clear or translucent substrates using inks that do not have appreciable hiding power, rendering the printed images viewable from either side of the sheet material.

Images printed on the sheet material of the present invention 10, 18, may take the form of one or more security features (e.g., letters, numbers, alphanumeric codes, barcodes, microtext, digital watermarks, and the like), which serve to render the sheet material more resistant to counterfeiting. Such counterfeit-resistant sheet materials may be used to prepare secure documents such as lottery tickets.

In one such embodiment, the sheet material in the form of a secure document has a first security feature printed on one surface of the sheet material using an HP Indigo printing press, and a second security feature printed on the same or opposing surface of the sheet material using a direct thermal printing device.

Printing may be performed by, for example, one or more variable data printing devices. The use of variable data printing devices allows for the manufacture of series of different secure documents in single print runs.

Images printed on the sheet material of the present invention 10, 18, may also be used in conjunction with a computer-implemented method and system for assessing the ability of a print advertising campaign to generate new business.

In one such contemplated computer-implemented method, the method comprises:

collecting information printed on advertising materials used in a print advertising campaign including the names and addresses of each recipient or intended recipient thereof, wherein the advertising materials are prepared from the above-described sheet materials, wherein the information is printed using a direct thermal printing device and an HP Indigo printing press, and wherein the advertising materials direct each recipient to a web address or URL and/or provides each recipient with a contact number;

storing the collected information in a database;

recording each time a recipient of the advertising material visits the web address or URL or calls the contact number to request additional information or to order advertised goods or services;

storing the recorded information in the database; and displaying the information stored in the database in a form that enables a viewer to assess the ability of a print advertising campaign to generate new business.

The associated print advertising campaign assessment system comprises:

a computer having a memory device;

a database stored in the memory device, the database containing information printed on advertising materials from a print advertising campaign including the name and address of each recipient or intended recipient of the advertising materials, wherein the advertising materials are prepared from the above-described sheet materials; and an internet connection operably connecting the computer to one or more communication systems accessible by the recipients of the print advertising materials, wherein the computer is operable to collect, record, store and process information from the advertising materials and from the recipients including requests by the recipients for additional information and orders for advertised goods or services; and wherein the computer is operable to display the information stored in the database in a form that enables a viewer to assess the ability of a print advertising campaign to generate new business.

Aspects of the present invention will now be further illustrated by reference to the following additional non-limiting test samples or working examples.

EXAMPLES

1. The coatings and dispersions used to prepare these additional test samples or working examples are described below:

HP Indigo Receptive Coating (C1)

An HP Indigo receptive coating was prepared by adding the below-referenced components to a low shear mixer, and stirring for about 30 minutes.

114 parts of colloidal silica pigment (LUDOX AM, supplied by Grace Davison as a 30% solids dispersion);

1.6 parts of an acrylate based copolymer binder (ALCOGUM L-289, supplied by Alco Chemical as a 25% solids emulsion);

34 parts of an ethylene/acrylic acid copolymer binder (RAYTECH 21073, supplied by Specialty Polymers, Inc. as a 28% solids emulsion);

12.8 parts of waterborne aliphatic urethane/acrylic copolymer binder (NEOPAC R-9000, supplied by DSM NeoResins as a 40% solids emulsion);

0.34 parts of an optical brightener (TINOPAL ABP-A, supplied by Ciba Specialty as a water-based solution at 29% solids);

0.05 parts of a surfactant (SURFYNOL 104A, supplied by Air Products as a 50% solution);

0.33 parts of a non-ionic fluorosurfactant (ZONYL FSN, supplied by E.I. Dupont de Nemours as a 40% solids solution);

0.03 parts of a dispersing agent (DISPERBYK 190, supplied by Byk Chemie as a 40% solids water based solution);

0.56 parts of a polyethylene wax emulsion (JONWAX 4, supplied by Johnson Polymer as a 40% emulsion); and 1.85 parts of an oxidized high density polyethylene wax (AQUACER 513, supplied by Byk Chemie USA, Inc. as a 35% solids emulsion).

Developer Dispersion (C2)

A developer dispersion was prepared by mixing and then grinding the below-referenced components using a sand mill to an average particle size of about 0.45 microns, the resulting dispersion being about 56% solids.

380 parts of water;

2 parts of a defoaming agent (NOPCO 1407K, supplied by Miki Sangyo, San Nopco Limited as a 15% emulsion);

44 parts of a partially hydrolyzed polyvinyl alcohol binder (GOHSERAN L-3266, supplied by Nippon Gohsei); and 440 parts of a developer, namely, 4,4'-sulfonylbis(2-(2-propenyl)phenol) (TG-SH, supplied by Nippon Kayaku Co.).

Leuco Dye Dispersion (C3)

A leuco dye dispersion was prepared by mixing and then grinding the below-referenced components using a sand mill to an average particle size of about 0.50 microns, the resulting dispersion being about 48% solids.

380 parts of water;

4.6 parts of a defoaming agent (NOPCO 1407K, supplied by Miki Sangyo, San Nopco Limited as a 15% emulsion);

10 parts of a partially hydrolyzed polyvinyl alcohol binder (ELVANOL 51-05, supplied by Air Products);

15 parts of an hydroxypropyl methyl cellulose binder (METOLOSE 60-SH-03, supplied by Shin-Etsu Chemical Co., Limited);

6.3 parts of a wetting agent (AEROSOL OT-75, supplied by Hubbard Hall as a 75% solution); and 325 parts of a leuco dye (BLACK 400, supplied by Sofix Corporation).

Thermal Overcoat Protective Coating (C4)

A thermal overcoat protective coating was prepared by adding the below-referenced components to a mixer while stirring, and continuing stirring for about 60 minutes while maintaining good surface agitation.

230 parts of water;

330 parts of a 10% aqueous solution of a mixture of a modified polyvinyl alcohol binder (GOHSEFIMER Z-200, supplied by Marubeni Specialty Chemicals), boric acid and potassium aluminum sulfate at a dry weight ratio of about 100:1:1, respectively;

0.2 parts of a dispersing agent (DISPEX N-40, supplied by Ciba Specialty Chemicals at 40% solids);

5 parts of an amorphous silica pigment (ZEOTHIX 177, supplied by MF Cachat Co.);

1 part of a defoaming agent (NOPCO 1407K, supplied by Miki Sangyo, San Nopco Limited as a 15% emulsion);

100 parts of a pigment dispersion (65% solids) containing clay pigment (ULTRA WHITE 90 COATING CLAY, supplied by Engelhard Corporation) and a dispersing agent (DISPEX N-40, supplied by Ciba Specialty Chemicals at 40% solids) at a dry weight ratio of about 400:1, respectively;

27 parts of a lubricant in the form of a zinc stearate dispersion (HIDORIN Z-8, supplied by Nagase Corporation at 36% solids);

6 parts of a polyethylene wax emulsion (JONWAX 4, supplied by Johnson Polymer as a 40% emulsion);

60 parts of a polyurethane resin binder (HYDRAN AP 30F, supplied by Miki Sangyo USA at 20% solids);

2 parts of a surfactant (AEROSOL OT-75, supplied by Cytec Industries); and 2.7 parts of a crosslinking agent (POLYCUP 172, supplied by Hercules Corporation at 12.5% solids).

Thermal or Heat Sensitive Coating (C5)

A thermal or heat sensitive coating was prepared by adding the below-referenced components to a low shear mixer, and stirring for about 30 minutes while maintaining good surface agitation.

105 parts of water;
66 parts of Developer Dispersion C2 (as described above);
79 parts of a styrene-acrylic copolymer binder (RHOPLEX P-376, supplied by Rohm and Haas at 50% solids);
46 parts of Leuco Dye Dispersion C3 (as described above);
0.4 parts of a surfactant (SURFYNOL 440, supplied by Air Products);
0.3 parts of a defoaming agent (NOPCO 1407K, supplied by Miki Sangyo, San Nopco Limited as a 15% emulsion);
0.7 parts of an optical brightener (TINOPAL ABP-A, supplied by Ciba Specialty as a water-based solution at 29% solids);
0.15 parts of a glyoxal crosslinker (GLYOXAL 40%, supplied by Astro Chemical, Inc.); and
5.3 parts of a crosslinker in the form of a 10% water based solution of adipic acid dihydrazide (ADH, supplied by Marubeni Specialty Chemicals as a powder).

2. The additional test samples or working examples were prepared as described below:

Working Example W-1

A commercially available direct thermal paper tag media having an overcoat protective layer (KT300, supplied by Kanzaki Specialty Papers, Inc.) was coated on the direct thermal side with HP Indigo Receptive Coating C1 to a dry coat weight of about 2.1 grams per square meter (g/m²). The overcoat protective layer used with KT300 was similar to C4. The binder was a modified polyvinyl alcohol binder (GOHSEFIMER Z-200, supplied by Marubeni Specialty Chemicals) and the pigment was a clay pigment (ULTRA WHITE 90 COATING CLAY, supplied by Engelhard Corporation).

Working Example W-2

A media prepared as described for W-1 above was coated on the backside of the direct thermal side with HP Indigo Receptive Coating C1 to a dry, coat weight of about 3.2 g/m².

The direct thermal side of W-2 will hereinafter be referred to as "KT300HP", while the backside of W-2 will be referred to as "KT300HP-Back".

Working Example W-3

A commercially available direct thermal tear resistant polyethylene film media having an overcoat protective layer (identical to C4) (POLYCASH 63100XTR, supplied by Kanzaki Specialty Papers, Inc.) (hereinafter, KPT63100) was coated on the direct thermal side with HP Indigo Receptive Coating C1 to a dry coat weight of about 1.9 g/m².

Working Example W-4

A media prepared as described for W-3 above was coated on the backside of the direct thermal side with HP Indigo Receptive Coating C1 to a dry coat weight of about 1.9 g/m².

Working Example W-5

A commercially available direct thermal polypropylene is film media having an overcoat protective layer (identical to C4) (KPT 3370, supplied by Kanzaki Specialty Papers, Inc.) (hereinafter, KPT 3370) was coated on the direct thermal side with HP Indigo Receptive Coating C1 to a dry coat weight of about 3.4 g/m².

Working Example W-6

A commercially available direct thermal polypropylene film media having an overcoat protective layer (identical to C4) (KPT 3370, supplied by Kanzaki Specialty Papers, Inc.) was coated on the direct thermal side with HP Indigo Receptive Coating C1 to a dry coat weight of about 4.6 g/m².

Working Example W-7

A heat sensitive or thermal recording media was prepared by applying a coating formulation (as described below) to a 2.8 mil polypropylene film substrate (POLYLITH PB1-HG, supplied by Granwell Products) to a dry coat weight of about 4 g/m².

coating formulation:
15.8 parts of water;
9 parts of Developer Dispersion C2;
6.3 parts of Leuco Dye Dispersion C3;
0.05 parts of a surfactant (SURFYNOL 440, supplied by Air Products); and
6.4 parts of a carboxylated styrene butadiene latex binder (LATEX CP620 NA, supplied by The Dow Chemical Company at 50% solids).

Working Example W-8

A heat sensitive or thermal recording media was prepared as described for W-7 above, except that the LATEX CP620 NA latex component was replaced by an acrylic polymer emulsion (JONCRYL 537, supplied by Johnson Company) in the same amount on a dry weight basis.

Working Example W-9

A heat sensitive or thermal recording media was prepared as described for W-7 above, except that the LATEX CP620 NA latex component was replaced by a waterborne aliphatic urethane/acrylic copolymer (NEOPAC R-9000, supplied by DSM NeoResins as a 40% solids emulsion) in the same amount on a dry weight basis.

Working Example W-10

A heat sensitive or thermal recording media was prepared as described for W-7 above, except that the LATEX CP620 NA latex component was replaced by a styrene acrylic copolymer ((RHOPLEX P-376, supplied by Rohm and Haas at 50% solids) in the same amount on a dry weight basis.

Working Example W-11

A heat sensitive or thermal recording media was prepared as described for W-7 above, and then Thermal Overcoat Protective Coating C4 was applied to a dry coat weight of about 1.4 $g/m^2$.

Working Example W-12

A heat sensitive or thermal recording media was prepared as described for W-8 above, and then Thermal Overcoat Protective Coating C4 was applied to a dry coat weight of about 1.4 $g/m^2$.

Working Example W-13

A heat sensitive or thermal recording media was prepared as described for W-9 above, and then Thermal Overcoat Protective Coating C4 was applied to a dry coat weight of about 1.4 $g/m^2$.

Working Example W-14

A heat sensitive or thermal recording media was prepared as described for W-10 above, and then Thermal Overcoat Protective Coating C4 was applied to a dry coat weight of about 1.4 $g/m^2$.

Working Examples W-11B-W-14B

HP Indigo Receptive Coating C1 was applied to Working Examples W-11 through W-14, in each case to a dry coat weight of about 1.6 $g/m^2$.

Working Example W-15

For this example, Thermal Overcoat Protective Coating C4 was modified by incorporating a minor amount of a styrene-acrylic copolymer (RHOPLEX P-376, supplied by Rohm and Haas at 50% solids) at a rate of 100:5 on a dry weight basis (i.e., mixed at a ratio of 100 dry parts of C4 to 5 dry parts of styrene-acrylic copolymer). The modified coating was then applied to a heat sensitive or thermal recording media prepared as described for W-10 above, to a dry coat weight of 1.7 $g/m^2$. Finally, the HP Indigo Receptive Coating C1 was applied as an outermost layer to a dry coat weight of 1.6 $g/m^2$.

Working Example W-16

For this example, Thermal Overcoat Protective Coating C4 was modified by incorporating a minor amount of an acrylic polymer emulsion (JONCRYL 537, supplied by Johnson Company) at a rate of 100:10 on a dry weight basis (i.e., mixed at a ratio of 100 dry parts of C4 to 10 dry parts of acrylic polymer). The modified coating was then applied to a heat sensitive or thermal recording media prepared as described for W-10 above, to a dry coat weight of 1.7 $g/m^2$. Finally, the HP Indigo Receptive Coating C1 was applied as an outermost layer to a dry coat weight of 1.6 $g/m^2$.

Working Example W-17

For this example, Thermal Overcoat Protective Coating C4 was modified by incorporating a minor amount of a carboxylated styrene butadiene latex (LATEX CP620 NA, supplied by The Dow Chemical Company at 50% solids) at a rate of 100:10 on a dry weight basis (i.e., mixed at a ratio of 100 dry parts of C4 to 10 dry parts of carboxylated styrene butadiene latex). The modified coating was then applied to a heat sensitive or thermal recording media prepared as described for W-10 above, to a dry coat weight of 1.7 $g/m^2$. Finally, the HP Indigo Receptive Coating C1 was applied as an outermost layer to a dry coat weight of 1.6 $g/m^2$.

Working Example W-18

For this example, Thermal Overcoat Protective Coating C4 was modified by incorporating a minor amount of a waterborne aliphatic urethane/acrylic copolymer (NEOPAC R-9000, supplied by DSM NeoResins as a 40% solids emulsion) at a rate of 100:10 on a dry weight basis (i.e., mixed at a ratio of 100 dry parts of C4 to 10 dry parts of aliphatic urethane/acrylic copolymer). The modified coating was then applied to a heat sensitive or thermal recording media prepared as described for W-10 above, to a dry coat weight of 1.7 $g/m^2$. Finally, the HP Indigo Receptive Coating C1 was applied as an outermost layer to a dry coat weight of 1.6 $g/m^2$.

Working Example W-19

For this example, Thermal Overcoat Protective Coating C4 was applied to a heat sensitive or thermal recording media prepared as described for W-10 above, to a dry coat weight of 1.7 $g/m^2$. Finally, the HP Indigo Receptive Coating C1 was applied as an outermost layer to a dry coat weight of 1.6 $g/m^2$.

Working Example W-20

A heat sensitive or thermal recording media was prepared by applying Thermal or Heat Sensitive Coating C5 to a 2.8 mil polypropylene film substrate (POLYLITH PB1-HG, supplied by Granwell Products) to a dry coat weight of about 4 $g/m^2$.

Working Example W-21

For this example, Thermal Overcoat Protective Coating C4 was modified by incorporating a minor amount of an acrylic polymer emulsion (JONCRYL FC 284, supplied by BASF Corporation at 31% solids) at a rate of 100:10 on a dry weight basis (i.e., mixed at a ratio of 100 dry parts of C4 to 10 dry parts of acrylic polymer). The modified coating was then applied to a heat sensitive or thermal recording media prepared as described for W-20 above, to a dry coat weight of 2.3 $g/m^2$. Finally, the HP Indigo Receptive Coating C1 was applied as an outermost layer to a dry coat weight of 1.7 $g/m^2$.

Working Example W-22

For this example, Thermal Overcoat Protective Coating C4 was modified by incorporating a minor amount of a waterborne aliphatic urethane/acrylic copolymer (NEOPAC R-9000, supplied by DSM NeoResins as a 40% solids emulsion) at a rate of 100:10 on a dry weight basis (i.e., mixed at a ratio of 100 dry parts of C4 to 10 dry parts of aliphatic urethane/acrylic copolymer). The modified coating was then applied to a heat sensitive or thermal recording media prepared as described for W-20 above, to a dry coat weight of 2.3 g/m². Finally, the HP Indigo Receptive Coating C1 was applied as an outermost layer to a dry coat weight of 1.7 g/m².

Working Example W-23

For this example, Thermal Overcoat Protective Coating C4 was modified by incorporating a minor amount of a waterborne aliphatic urethane/acrylic copolymer (NEOPAC R-9000, supplied by DSM NeoResins as a 40% solids emulsion) at a rate of 100:10 on a dry weight basis (i.e., mixed at a ratio of 100 dry parts of C4 to 10 dry parts of aliphatic urethane/acrylic copolymer). The modified coating was then applied to a heat sensitive or thermal recording media prepared as described for W-20 above, to a dry coat weight of 1.7 g/m². Finally, the HP Indigo Receptive Coating C1 was applied as an outermost layer to a dry coat weight of 1.7 g/m².

3. The tests used to evaluate these additional test samples or working examples are described below.

Image or Optical Density ($OD_{initial}$): The test samples were imaged using an Atlantek 400 printer (model 400) at a setting of medium energy, pattern 5, ten energy steps. The optical density of each image at each energy step was then measured, visual mode, using an X-Rite 530 spectrodensitometer (model number 530).

Heat resistance (60° C.): Test samples imaged on the Atlantek 400 printer were placed in a dry oven at 60° C. for 24 hours. Optical densities at every energy step were measured before and after the test. Imaged retention was calculated as follows:

$$\% \text{ imaged retention} = \frac{\text{optical density after exposure}}{\text{optical density before exposure}} \times 100$$

Heat resistance (90° C.): Test samples imaged on the Atlantek 400 printer were placed in a dry oven at 90° C. for 1 hour. Optical densities at every energy step were measured before and after the test. Imaged retention was calculated as set forth above.

Heat and Humidity test (90% RH): Imaged test samples were placed in a chamber and kept at 40° C., 90% relative humidity for 24 hours. Optical densities at every energy step were measured before and after the test. Imaged retention was calculated as set forth above.

Water resistance test (W-R): Imaged test samples were immersed in tap water for 15 hours. Optical densities at every energy step were measured before and after the test. Imaged retention was calculated as set forth above.

Imaging Oil Resistance test (I-Oil-R): Imaging oil used on HP Indigo printing presses was applied on the imaged test samples with a paper towel saturated with imaging oil. Then test samples were then placed in a dry oven at 40° C. for 15 hours. Optical densities at every energy step were measured before and after the test. Imaged retention was calculated as set forth above.

Plasticizer Resistance test (Plast-R): Each imaged test sample was placed printed side up on a plastic container, wrapped three times using a clear stretch wrap is film (RESINITE® plastic packaging film (RMF-61AH) containing plasticizers and placed in a dry oven at 40° C. for 15 hours. Optical densities at every energy step were measured before and after the test. Imaged retention was calculated as set forth above.

Ethyl Alcohol Resistance test (Et-R): Imaged test samples were immersed in a 20% ethyl alcohol solution for two hours. Optical densities at every energy step were measured before and after the test. Imaged retention was calculated as set forth above.

Isopropyl Alcohol Resistance test (IPA-70% (30 sec) or IPA-70% (60 sec)): Imaged test samples were exposed to 70% isopropyl alcohol by applying about two drops on the surface and then wiping the excess using a paper towel with light pressure after 30 or 60 seconds. The samples were evaluated as follows:

| Rating | Visual Appearance |
| --- | --- |
| Excellent | No change to the background or imaged exposed area |
| Good | Minimal change to the background or imaged exposed area |
| Fair | Moderate background change but imaged area is slightly or not affected |
| Poor | Background and/or imaged area are significantly affected |

Coating Adhesion: The prepared test samples were tested for coating adhesion by placing a strip of 3M 610 tape on the coated surface, then rolling a 2.27 kilogram (kg) weighted roller back and forth twice over the tape and finally manually pulling the strip off with moderate speed at approximately a 90° angle. The level of adhesion was then evaluated and rated as forth below:

| Rating | Coating Adhesion |
| --- | --- |
| Very Good | minimal to no coating loss |
| Good | low amount of coating loss |
| Moderate | moderate coating loss |
| Poor | majority of coating is lost |

Ink Adhesion: Adhesion was measured 15 minutes after printing by applying a 3M drafting tape #230 or 3M 610 tape on Cyan (C), Magenta (M), Yellow (Y) and Black (Bk) colors (each color printed at 100% coverage) using a weighted two pound roller and finally manually pulling the tape off with moderate speed at approximately a 90° angle. The level of ink adhesion was evaluated and rated as set forth below:

| Rating | Ink Adhesion |
| --- | --- |
| Excellent | >90% ink retention (C, M, Y &Bk) |
| Good | >80% ink retention (C, M, Y &Bk) |
| Poor | <80% ink retention (C, M, Y or Bk) |

4. The test results from the Working Examples are detailed below. As previously mentioned, a media suitable for both HP Indigo and direct thermal printing applications has to demonstrate a number of different properties to meet the requirements of each application.

In the case of HP Indigo printing and as is well known to those skilled in the art, at some point during the printing process, ink is applied onto a blanket and then transferred to the media. It is required that the ink transfer completely from the blanket to the media, otherwise ink may remain in the blanket and temporarily contaminate subsequent prints or permanently cause repetitive printing defects in that area. The outermost coated layer of a multilayer construction therefore has to have a very good affinity to HP Indigo inks and sufficient adhesion to underlying layers and the substrate to protect against blanket contamination.

In the case of direct thermal printing, imaging performance and durability or resistance to various conditions are important considerations.

The test results obtained for the Working Examples demonstrate the suitability of the present inventive multi-layer sheet material for both printing applications.

Working Example W-2

The direct thermal side of W-2 (KT300HP) and the direct thermal side of the commercially available direct thermal paper tag media (KT300) were imaged using an Atlantek 400 printer (model number 400). The printer settings as well as the image or optical densities of the imaged samples before and after exposure to heat, heat and humidity, water, plasticizer, ethyl alcohol and imaging oil, are shown in Tables 1 and 2 below.)

In another evaluation, both sides of W-2 (i.e., the direct thermal side (KT300HP) and the backside (KT300HP-Back)) and the direct thermal side of KT300 were printed on an HPws4050 Indigo digital press and tested for ink adhesion. The results are shown in Table 3 below.

TABLE 3

| Sample | Ink Adhesion |
|---|---|
| W-2 (KT300HP) | Excellent (3M #230 tape) |
| W-2 (KT300HP-Back) | Excellent (3M #230 tape) |
| KT300 (thermal side) | Poor (3M #230 tape) |

As is evident from the results shown in Table 3, the ink adhesion for KT300HP and KT300HP-Back were excellent. As noted above, while the blanket on the HPws4050 Indigo digital press was heated to about 146° C. at the point of ink transfer to the media, this did not serve to affect (i.e., image) the background areas of the inventive media. In regard to KT300, ink adhesion was so poor that the ink did not transfer

TABLE 1

| Atlantek Step | Energy (mJ/mm$^2$) | Average OD$_{initial}$ | W-2 (KT300HP) (% Retention after exposure) | | | | | | |
|---|---|---|---|---|---|---|---|---|---|
| | | | 60° C. | 90° C. | 90% RH | W-R | Plast.-R | Et.-R | I-Oil-R |
| 1 | 3.22 | 0.05 | 120.00 | 616.67[1] | 120.00 | 120.00 | 100.00 | 100.00 | 100.00 |
| 2 | 4.14 | 0.11 | 7.78 | 363.64 | 58.33 | 81.82 | 80.00 | 53.85 | 83.33 |
| 3 | 4.88 | 0.38 | 46.43 | 121.62 | 32.43 | 57.50 | 71.05 | 27.27 | 89.74 |
| 4 | 5.79 | 0.81 | 51.35 | 88.61 | 46.75 | 81.93 | 82.76 | 35.80 | 90.36 |
| 5 | 6.81 | 1.19 | 65.79 | 86.44 | 79.65 | 84.43 | 92.37 | 60.50 | 98.43 |
| 6 | 8.04 | 1.50 | 74.65 | 92.81 | 96.67 | 83.22 | 99.33 | 63.40 | 100.66 |
| 7 | 9.49 | 1.61 | 102.63 | 96.39 | 101.89 | 80.49 | 100.00 | 66.06 | 102.45 |
| 8 | 11.21 | 1.66 | 98.76 | 89.35 | 100.00 | 80.61 | 101.22 | 64.33 | 99.40 |
| 9 | 13.2 | 1.66 | 99.39 | 89.82 | 94.64 | 79.76 | 100.00 | 63.91 | 100.00 |
| 10 | 15.59 | 1.64 | 97.53 | 85.54 | 95.78 | 78.31 | 98.77 | 66.06 | 100.62 |

TABLE 2

| Atlantek Step | Energy (mJ/mm$^2$) | Average OD$_{initial}$ | KT300 (% Retention after exposure) | | | | | | |
|---|---|---|---|---|---|---|---|---|---|
| | | | 60° C. | 90° C. | 90% RH | W-R | Plast.-R | Et.-R | I-Oil-R |
| 1 | 3.22 | 0.05 | 120.00 | 660.00[1] | 120.00 | 120.00 | 100.00 | 120.00 | 100.00 |
| 2 | 4.14 | 0.14 | 36.84 | 300.00 | 41.18 | 61.54 | 42.86 | 46.15 | 83.33 |
| 3 | 4.88 | 0.47 | 35.09 | 126.32 | 36.36 | 63.83 | 31.11 | 26.09 | 78.05 |
| 4 | 5.79 | 0.87 | 56.70 | 83.13 | 63.22 | 86.05 | 57.78 | 51.81 | 90.70 |
| 5 | 6.81 | 1.29 | 76.87 | 80.95 | 79.39 | 79.39 | 80.31 | 66.94 | 94.53 |
| 6 | 8.04 | 1.49 | 96.00 | 93.46 | 96.71 | 78.47 | 96.69 | 68.71 | 100.69 |
| 7 | 9.49 | 1.57 | 99.37 | 92.26 | 99.36 | 75.00 | 101.27 | 67.31 | 99.36 |
| 8 | 11.21 | 1.58 | 99.37 | 90.45 | 100.64 | 74.52 | 100.00 | 65.19 | 100.00 |
| 9 | 13.2 | 1.57 | 99.36 | 87.26 | 98.06 | 75.16 | 100.63 | 67.72 | 101.28 |
| 10 | 15.59 | 1.53 | 100.66 | 88.08 | 98.04 | 76.47 | 101.29 | 68.42 | 100.00 |

[1]At the low energy level of Atlantek Step 1, the optical density reading is equivalent to the background or unimaged areas. As evident from the reading taken at 90° C., both medias were sensitive enough that the background reading changed significantly. That being said, it was found that the blanket on the HPws4050 Indigo digital press, which is heated to about 146° C. at the point of ink transfer to the media, did not affect these background readings.

As is evident from the results shown in these tables, durability performance demonstrated by W-2 and KT300 were comparable except that W-2 showed an is enhanced plasticizer resistance especially at lower energy levels. As will be readily appreciated by those skilled in the art, this is preferred for grayscale printing applications.

The enhanced plasticizer resistance demonstrated by W-2, which is more than an additive performance effect, suggests a synergistic effect between the thermal overcoat protective coating C4 layer and the HP Indigo receptive coating C1 layer in terms of plasticizer resistance.

completely from the blanket to the media and after a few prints the blanket was contaminated and had to be replaced.

In yet another evaluation, a yellow background was printed on the direct thermal side of W-2 (KT300HP) using an HPws4050 Indigo digital press. The optical density of the yellow background was measured at 0.91 using an X-Rite 530 spectrodensitometer (model number 530, automatic mode). A black barcode was then printed on the yellow background using an Atlantek 400 printer (model number 400) at a setting of medium energy, pattern 6, step 9. The printed barcode was then scanned using a Webscan TruCheck scanner (firmware 1.73, ten readings). The American National Standards Institute (ANSI) rating for this printed barcode was A (4.0) (i.e., the highest possible rating).

While a yellow background and black barcode was used in this evaluation, it will be readily appreciated that any combination of sufficiently contrasting colors will produce a usable barcode.

W-2 samples having a printed yellow background on the direct thermal side (KT300HP), as described above, were also imaged using the Atlantek 400 printer at a setting of medium energy, pattern 5, ten energy steps. Image or optical densities of these imaged samples before and after exposure to heat, heat and humidity, water, plasticizer, ethyl alcohol and imaging oil, are shown in Table 4 below.

TABLE 4

| Atlantek Step | Energy (mJ/mm$^2$) | Average OD$_{initial}$ | W-2 (KT300HP)-Yellow Ink (% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.10 | 110.00 | 100.00 | 110.00 | 100.00 | 122.22 | 111.11 |
| 2 | 4.14 | 0.10 | 110.00 | 100.00 | 110.00 | 100.00 | 122.22 | 100.00 |
| 3 | 4.88 | 0.17 | 82.35 | 73.33 | 47.83 | 82.35 | 84.62 | 88.89 |
| 4 | 5.79 | 0.45 | 52.08 | 43.59 | 20.97 | 89.74 | 44.83 | 87.04 |
| 5 | 6.81 | 0.80 | 64.37 | 46.84 | 25.81 | 101.45 | 33.80 | 97.59 |
| 6 | 8.04 | 1.14 | 71.90 | 82.69 | 53.49 | 104.08 | 61.61 | 102.50 |
| 7 | 9.49 | 1.43 | 98.62 | 94.96 | 75.84 | 99.31 | 83.70 | 104.08 |
| 8 | 11.21 | 1.50 | 104.00 | 98.03 | 91.56 | 100.66 | 94.00 | 112.14 |
| 9 | 13.2 | 1.53 | 100.00 | 99.35 | 94.12 | 101.31 | 93.51 | 104.76 |
| 10 | 15.59 | 1.50 | 97.32 | 100.00 | 90.67 | 100.00 | 90.67 | 101.34 |

Considering the results shown in Table 4, one may conclude that HP Indigo inks advantageously provide an additional layer of protection that may be beneficial for some direct thermal printing applications. More specifically, the results shown in Table 4 (see Atlantek Steps 7 through 10) generally show improved durability, as compared to those thermally imaged samples of KT300HP or KT300 that were not also printed with HP Indigo inks.

Working Example W-4

The direct thermal side of W-4 (KPT63100HP) and the direct thermal side of the commercially available direct thermal polyethylene film media (KPT63100) were imaged using an Atlantek 400 printer (model number 400). The printer settings as well as the image or optical densities of the imaged samples before and after exposure to heat, heat and humidity, water, plasticizer, ethyl alcohol and imaging oil, are shown in Tables 5 and 6 below.

TABLE 5

| Atlantek Step | Energy (mJ/mm$^2$) | Average OD$_{initial}$ | W-4 (KPT63100HP) (% Image Retention after testing) | | | | | |
|---|---|---|---|---|---|---|---|---|
| | | | 60° C. | 90° C. | 90% RH | W-R | Plast.-R | Et.-R | I-Oil-R |
| 1 | 3.22 | 0.05 | 160.00 | 700.00 | 140.00 | 160.00 | 120.00 | 120.00 | 120.00 |
| 2 | 4.14 | 0.05 | 160.00 | 700.00 | 140.00 | 140.00 | 120.00 | 100.00 | 120.00 |
| 3 | 4.88 | 0.08 | 90.91 | 462.50 | 87.50 | 100.00 | 85.71 | 85.71 | 100.00 |
| 4 | 5.79 | 0.25 | 54.84 | 157.69 | 39.13 | 68.97 | 73.91 | 39.13 | 81.82 |
| 5 | 6.81 | 0.54 | 64.62 | 92.59 | 49.06 | 82.46 | 81.82 | 40.82 | 100.00 |
| 6 | 8.04 | 0.94 | 72.12 | 71.88 | 65.91 | 87.88 | 91.01 | 57.95 | 98.91 |
| 7 | 9.49 | 1.33 | 82.43 | 70.00 | 78.74 | 94.93 | 90.63 | 67.20 | 97.54 |
| 8 | 11.21 | 1.60 | 91.57 | 80.25 | 96.45 | 95.68 | 98.72 | 67.76 | 100.00 |
| 9 | 13.2 | 1.72 | 97.70 | 90.64 | 98.27 | 97.11 | 99.42 | 67.65 | 99.42 |
| 10 | 15.59 | 1.75 | 99.43 | 94.86 | 100.57 | 98.86 | 100.00 | 62.29 | 100.57 |

TABLE 6

| Atlantek Step | Energy (mJ/mm$^2$) | Average OD$_{initial}$ | KPT63100 (% Image Retention after testing) | | | | | |
|---|---|---|---|---|---|---|---|---|
| | | | 60° C. | 90° C. | 90% RH | W-R | Plast.-R | Et.-R | I-Oil-R |
| 1 | 3.22 | 0.06 | 166.67 | 733.33 | 133.33 | 100.00 | 85.71 | 116.67 | 116.67 |
| 2 | 4.14 | 0.07 | 142.86 | 733.33 | 114.29 | 100.00 | 85.71 | 100.00 | 133.33 |

TABLE 6-continued

| Atlantek Step | Energy (mJ/mm²) | Average OD$_{initial}$ | KPT63100 (% Image Retention after testing) | | | | | | |
|---|---|---|---|---|---|---|---|---|---|
| | | | 60° C. | 90° C. | 90% RH | W-R | Plast.-R | Et.-R | I-Oil-R |
| 3 | 4.88 | 0.22 | 64.00 | 242.11 | 50.00 | 58.33 | 30.43 | 42.86 | 82.35 |
| 4 | 5.79 | 0.54 | 59.32 | 109.62 | 54.72 | 75.86 | 18.52 | 47.27 | 87.50 |
| 5 | 6.81 | 0.92 | 65.35 | 85.56 | 75.82 | 82.00 | 21.51 | 60.67 | 101.20 |
| 6 | 8.04 | 1.29 | 74.81 | 82.54 | 85.71 | 90.51 | 61.90 | 66.41 | 99.21 |
| 7 | 9.49 | 1.52 | 92.05 | 86.36 | 94.04 | 94.84 | 71.33 | 69.74 | 101.34 |
| 8 | 11.21 | 1.61 | 98.14 | 94.41 | 98.13 | 97.52 | 96.30 | 73.13 | 101.88 |
| 9 | 13.2 | 1.60 | 102.55 | 96.89 | 98.76 | 97.48 | 98.15 | 73.29 | 101.86 |
| 10 | 15.59 | 1.53 | 104.03 | 100.65 | 99.35 | 100.00 | 100.64 | 72.08 | 103.85 |

As is evident from the results shown in these tables, durability performance demonstrated by W-4 and KPT63100 were comparable except that W-4 showed an enhanced plasticizer resistance especially at mid-lower energy levels. As noted above, this is preferred for grayscale printing applications.

In another evaluation, both sides of W-4 (i.e., the direct thermal side (KPT63100HP) and the backside (KPT63100HP-Back)) and the direct thermal side of KPT63100 were printed on an HPws4050 Indigo digital press and tested for ink adhesion. The results are shown in Table 7 below.

TABLE 7

| Sample | Ink Adhesion |
|---|---|
| W-4 (KPT63100HP) | Excellent (3M #230 tape) |
| W-4 (KPT63100HP-Back) | Excellent (3M #610 tape) |
| KPT63100 (thermal side) | Poor (3M #230 tape) |

As shown in Table 7, the ink adhesion for W-4 (KPT63100HP) and W-4 is (KPT63100HP-Back) were excellent. Blanket compatibility was also excellent. In regard to KPT63100, ink adhesion again was so poor that the ink did not transfer completely from the blanket to the media and after a few prints the blanket was contaminated and had to be replaced.

In yet another evaluation, the direct thermal side of W-4 samples (KPT63100HP) were printed on an HPws4050 digital press with yellow, cyan and magenta Indigo inks and then imaged on an Atlantek model 400 (step 9). The imaged samples were then exposed to isopropyl alcohol in accordance with the test procedure detailed above. The results are shown in Table 8 below.

TABLE 8

| | W-4 (KPT63100HP) | W-4 (KPT63100HP) | W-4 (KPT63100HP) | W-4 (KPT63100HP) |
|---|---|---|---|---|
| HP Indigo Color | Non applied | Yellow | Cyan | Magenta |
| IPA-70% (30 sec) | Poor | Excellent | Good | Good |
| IPA-70% (60 sec) | Poor | Good | Fair | Fair |

As shown in Table 8, the yellow, cyan and magenta imaged areas demonstrated a significantly better isopropyl alcohol resistance, which would be useful for direct thermal wristband (e.g., hospital wristband) applications where the media may be subjected to this chemical.

As is known to those skilled in the art, an HP Indigo digital press can apply up to seven colors and up to 400% ink coverage. The present inventors note that apart from the above-tested colors, an HP Indigo digital press can also apply a clear ink, which may also aid in improving isopropyl alcohol resistance without changing the background color.

In addition to enhancing durability, the present invention may also serve to improve information security and the ability to quickly categorize information based on the printed or background color. Because both direct thermal and HP Indigo printing have variable data capabilities, it is possible to incorporate not only dual variable data but also color coded information suitable for barcode applications while improving durability and resistance to, for example, heat, heat and humidity, water, plasticizer, ethyl alcohol and imaging oil.

Working Examples W-5 and W-6

The direct thermal sides of W-5 (KPT3370HP) and W-6 (KPT3370HP) and the direct thermal side of the commercially available direct thermal polypropylene film media (KPT3370) were imaged using an Atlantek 400 printer (model number 400). The printer settings as well as the image or optical densities of the imaged samples before and after exposure to heat, heat and humidity, water, plasticizer, ethyl alcohol and imaging oil, are shown in Tables 9 to 11 below.

TABLE 9

| Atlantek Step | Energy (mJ/mm$^2$) | Average OD$_{initial}$ | W-5 (KPT3370HP) (% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 140.00 | 100.00 | 100.00 | 100.00 | 100.00 | 100.00 |
| 2 | 4.14 | 0.05 | 140.00 | 120.00 | 100.00 | 100.00 | 100.00 | 100.00 |
| 3 | 4.88 | 0.06 | 100.00 | 83.33 | 71.43 | 71.43 | 100.00 | 100.00 |
| 4 | 5.79 | 0.18 | 45.83 | 33.33 | 50.00 | 63.64 | 52.63 | 75.00 |
| 5 | 6.81 | 0.40 | 38.30 | 32.35 | 56.41 | 72.00 | 22.50 | 74.19 |
| 6 | 8.04 | 0.75 | 51.14 | 42.03 | 81.82 | 80.23 | 44.00 | 84.21 |
| 7 | 9.49 | 1.09 | 66.96 | 65.38 | 85.85 | 89.57 | 57.41 | 84.76 |
| 8 | 11.21 | 1.36 | 85.11 | 84.62 | 90.08 | 97.93 | 66.91 | 97.64 |
| 9 | 13.2 | 1.52 | 100.65 | 98.67 | 94.67 | 101.94 | 74.03 | 98.65 |
| 10 | 15.59 | 1.54 | 100.00 | 100.00 | 97.39 | 105.23 | 76.13 | 101.30 |

TABLE 10

| Atlantek Step | Energy (mJ/mm$^2$) | Average OD$_{initial}$ | W-6 (KPT3370HP) (% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 140.00 | 100.00 | 100.00 | 100.00 | 100.00 | 100.00 |
| 2 | 4.14 | 0.05 | 140.00 | 100.00 | 100.00 | 100.00 | 100.00 | 100.00 |
| 3 | 4.88 | 0.06 | 116.67 | 100.00 | 100.00 | 83.33 | 83.33 | 100.00 |
| 4 | 5.79 | 0.14 | 52.94 | 41.67 | 35.71 | 64.71 | 40.00 | 72.73 |
| 5 | 6.81 | 0.36 | 38.46 | 21.43 | 19.44 | 72.73 | 21.43 | 80.77 |
| 6 | 8.04 | 0.67 | 40.54 | 33.33 | 27.27 | 74.67 | 31.94 | 92.59 |
| 7 | 9.49 | 1.00 | 59.81 | 52.17 | 51.46 | 89.29 | 49.00 | 94.19 |
| 8 | 11.21 | 1.27 | 79.39 | 77.78 | 97.64 | 95.65 | 65.93 | 99.13 |
| 9 | 13.2 | 1.45 | 96.00 | 94.85 | 85.71 | 103.29 | 73.47 | 98.56 |
| 10 | 15.59 | 1.53 | 99.35 | 99.35 | 94.16 | 107.14 | 75.00 | 100.00 |

TABLE 11

| Atlantek Step | Energy (mJ/mm$^2$) | Average OD$_{initial}$ | KPT3370 (% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 140.00 | 120.00 | 80.00 | 100.00 | 100.00 | 100.00 |
| 2 | 4.14 | 0.05 | 140.00 | 120.00 | 80.00 | 100.00 | 100.00 | 100.00 |
| 3 | 4.88 | 0.14 | 60.00 | 50.00 | 42.86 | 29.41 | 43.75 | 66.67 |
| 4 | 5.79 | 0.42 | 40.91 | 32.43 | 48.78 | 11.11 | 34.78 | 72.97 |
| 5 | 6.81 | 0.78 | 50.57 | 56.94 | 82.43 | 13.10 | 46.25 | 89.86 |
| 6 | 8.04 | 1.17 | 70.00 | 93.52 | 100.00 | 11.57 | 55.74 | 97.27 |
| 7 | 9.49 | 1.39 | 89.44 | 90.37 | 100.74 | 9.79 | 68.79 | 100.74 |
| 8 | 11.21 | 1.46 | 99.32 | 100.68 | 97.95 | 21.09 | 72.60 | 101.37 |
| 9 | 13.2 | 1.47 | 99.34 | 97.95 | 96.58 | 98.62 | 73.47 | 100.68 |
| 10 | 15.59 | 1.42 | 99.30 | 105.59 | 97.89 | 106.34 | 77.86 | 101.38 |

As is evident from the results shown in these tables, W-5 and W-6 demonstrated significantly better plasticizer resistance, as compared to the direct thermal polypropylene film media KPT3370. W-6, which had an HP Indigo Receptive layer with a higher coat weight, demonstrated somewhat lower water, ethanol and heat and humidity resistance.

Working Examples W-7 through W-14 and W-11B through W-14B

These working examples differed in terms of binder composition in the thermal or heat sensitive coating layer, with examples W-11B through W-14B mirroring examples W-11 through W-14 but also employing an HP Indigo receptive layer. Coating adhesion was evaluated for each example in accordance with the test method detailed above. The results are shown in Table 12 below.

TABLE 12

|  | Example W-7 | Example W-8 | Example W-9 | Example W-10 |
|---|---|---|---|---|
| Substrate | PP/PB 1-HG | PP/PB 1-HG | PP/PB 1-HG | PP/PB 1-HG |
| Binder | Dow 620 NA | Joncryl 537 | Neopac R-9000 | Rhoplex P-376 |
| Adhesion 3M 610 | Good | Good | Excellent | Excellent |

|  | Example W-11 | Example W-12 | Example W-13 | Example W-14 |
|---|---|---|---|---|
| Coated media Overcoat protective layer | As per W-7 C4 | As per W-8 C4 | As per W-9 C4 | As per W-10 C4 |
| Adhesion 3M 610 | Good | Good | Excellent | Excellent |

|  | Example W-11B | Example W-12B | Example W-13B | Example W-14B |
|---|---|---|---|---|
| Coated media Overcoat protective layer | As per W-7 C4 | As per W-8 C4 | As per W-9 C4 | As per W-10 C4 |

TABLE 12-continued

| HP Indigo Receptive layer | C1 | C1 | C1 | C1 |
|---|---|---|---|---|
| Adhesion 3M 610 | Moderate | Moderate | Excellent | Excellent |

As shown in Table 12, all of the working examples demonstrated moderate, good, or excellent coating adhesion.

Working Examples W-15 through W-19

These working examples differed in terms of the composition of the Thermal Overcoat Protective Coating C4. In working examples W-15 through W-18, minor amounts of binder were added to the composition. The Thermal Overcoat Protective Coating C4 composition used in working example W-19 did not contain any additional binder. The direct thermal side of each sample was imaged using an Atlantek 400 printer (model number 400). The printer settings as well as the image or optical densities of the imaged samples before and after exposure to heat, heat and humidity, water, plasticizer, ethyl alcohol and imaging oil, are shown in Tables 13 to 17 below.

TABLE 13

| Atlantek Step | Energy (mJ/mm$^2$) | Average OD$_{initial}$ | W-15-Rhoplex-5% (% Image Retention after testing) | | | | | |
|---|---|---|---|---|---|---|---|---|
|  |  |  | 60° C. | 90% RH | W-R | Plast.-R | Et.-R | I-Oil-R |
| 1 | 3.22 | 0.05 | 140.00 | 175.00 | 125.00 | 125.00 | 150.00 | 100.00 |
| 2 | 4.14 | 0.05 | 140.00 | 140.00 | 100.00 | 100.00 | 180.00 | 100.00 |
| 3 | 4.88 | 0.09 | 110.00 | 77.78 | 55.56 | 66.67 | 88.89 | 110.00 |
| 4 | 5.79 | 0.28 | 85.71 | 42.86 | 70.37 | 33.33 | 46.43 | 117.24 |
| 5 | 6.81 | 0.60 | 91.38 | 59.02 | 85.25 | 31.58 | 50.85 | 109.09 |
| 6 | 8.04 | 0.99 | 105.15 | 75.51 | 79.21 | 32.63 | 59.38 | 103.67 |
| 7 | 9.49 | 1.41 | 106.77 | 64.58 | 67.81 | 54.61 | 57.14 | 102.67 |
| 8 | 11.21 | 1.68 | 103.01 | 72.78 | 65.09 | 57.14 | 59.04 | 102.35 |
| 9 | 13.2 | 1.75 | 100.57 | 102.31 | 60.11 | 76.70 | 61.49 | 100.00 |
| 10 | 15.59 | 1.73 | 99.42 | 105.26 | 62.15 | 71.02 | 59.65 | 100.59 |

TABLE 14

| Atlantek Step | Energy (mJ/mm$^2$) | Average OD$_{initial}$ | W-16-Joncryl 77-10% (% Image Retention after testing) | | | | | |
|---|---|---|---|---|---|---|---|---|
|  |  |  | 60° C. | 90% RH | W-R | Plast.-R | Et.-R | I-Oil-R |
| 1 | 3.22 | 0.05 | 120.00 | 140.00 | 100.00 | 100.00 | 180.00 | 120.00 |
| 2 | 4.14 | 0.05 | 140.00 | 140.00 | 100.00 | 83.33 | 200.00 | 100.00 |
| 3 | 4.88 | 0.11 | 109.09 | 63.64 | 50.00 | 54.55 | 75.00 | 120.00 |
| 4 | 5.79 | 0.33 | 78.79 | 43.24 | 71.43 | 36.67 | 48.39 | 110.00 |
| 5 | 6.81 | 0.66 | 87.14 | 60.00 | 88.57 | 51.72 | 54.55 | 111.67 |
| 6 | 8.04 | 1.04 | 93.69 | 64.08 | 77.78 | 32.67 | 57.84 | 112.87 |
| 7 | 9.49 | 1.47 | 102.70 | 69.28 | 63.58 | 43.06 | 59.06 | 109.42 |
| 8 | 11.21 | 1.72 | 102.33 | 101.71 | 68.57 | 62.94 | 61.63 | 104.82 |
| 9 | 13.2 | 1.78 | 101.10 | 100.56 | 65.00 | 78.09 | 64.25 | 101.74 |
| 10 | 15.59 | 1.77 | 100.00 | 103.91 | 68.36 | 86.03 | 62.92 | 101.17 |

TABLE 15

| Atlantek Step | Energy (mJ/mm$^2$) | Average OD$_{initial}$ | W-17-CP620-10% (% Image Retention after testing) | | | | | |
|---|---|---|---|---|---|---|---|---|
|  |  |  | 60° C. | 90% RH | W-R | Plast.-R | Et.-R | I-Oil-R |
| 1 | 3.22 | 0.05 | 160.00 | 160.00 | 100.00 | 100.00 | 180.00 | 120.00 |
| 2 | 4.14 | 0.05 | 160.00 | 160.00 | 100.00 | 100.00 | 180.00 | 120.00 |
| 3 | 4.88 | 0.11 | 118.18 | 53.33 | 60.00 | 55.56 | 90.00 | 107.69 |

TABLE 15-continued

| Atlantek Step | Energy (mJ/mm$^2$) | Average OD$_{initial}$ | W-17-CP620-10% (% Image Retention after testing) | | | | | |
|---|---|---|---|---|---|---|---|---|
| | | | 60° C. | 90% RH | W-R | Plast.-R | Et.-R | I-Oil-R |
| 4 | 5.79 | 0.33 | 90.00 | 42.50 | 66.67 | 29.63 | 54.84 | 112.82 |
| 5 | 6.81 | 0.66 | 92.42 | 67.53 | 91.67 | 16.95 | 60.00 | 108.22 |
| 6 | 8.04 | 1.07 | 97.06 | 85.00 | 81.31 | 11.00 | 65.35 | 107.34 |
| 7 | 9.49 | 1.46 | 103.55 | 100.64 | 75.69 | 15.38 | 62.86 | 105.88 |
| 8 | 11.21 | 1.73 | 101.72 | 100.00 | 67.43 | 31.95 | 62.35 | 101.73 |
| 9 | 13.2 | 1.78 | 100.00 | 102.26 | 65.36 | 55.06 | 66.67 | 100.56 |
| 10 | 15.59 | 1.78 | 100.00 | 102.84 | 65.73 | 78.77 | 70.39 | 101.14 |

TABLE 16

| Atlantek Step | Energy (mJ/mm$^2$) | Average OD$_{initial}$ | W-18-R9000-10% (% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 160.00 | 160.00 | 120.00 | 100.00 | 180.00 | 100.00 |
| 2 | 4.14 | 0.05 | 160.00 | 160.00 | 120.00 | 100.00 | 180.00 | 100.00 |
| 3 | 4.88 | 0.13 | 100.00 | 66.67 | 46.15 | 72.73 | 100.00 | 100.00 |
| 4 | 5.79 | 0.37 | 69.70 | 46.34 | 73.53 | 72.73 | 51.52 | 100.00 |
| 5 | 6.81 | 0.67 | 85.48 | 61.33 | 81.82 | 84.48 | 60.32 | 110.26 |
| 6 | 8.04 | 1.12 | 95.24 | 87.39 | 77.39 | 72.22 | 60.61 | 104.88 |
| 7 | 9.49 | 1.48 | 104.20 | 96.84 | 70.39 | 91.67 | 60.00 | 105.23 |
| 8 | 11.21 | 1.72 | 101.72 | 100.00 | 66.28 | 95.09 | 58.82 | 102.26 |
| 9 | 13.2 | 1.79 | 101.12 | 100.56 | 63.13 | 94.97 | 60.34 | 100.00 |
| 10 | 15.59 | 1.79 | 99.45 | 103.35 | 65.17 | 95.48 | 61.54 | 101.69 |

TABLE 17

| Atlantek Step | Energy (mJ/mm$^2$) | Average OD$_{initial}$ | W-19 (Control) (% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 160.00 | 120.00 | 80.00 | 100.00 | 160.00 | 100.00 |
| 2 | 4.14 | 0.05 | 140.00 | 120.00 | 80.00 | 100.00 | 160.00 | 100.00 |
| 3 | 4.88 | 0.11 | 120.00 | 61.54 | 45.45 | 88.89 | 88.89 | 100.00 |
| 4 | 5.79 | 0.33 | 96.30 | 45.24 | 55.88 | 68.97 | 44.83 | 110.53 |
| 5 | 6.81 | 0.63 | 96.43 | 77.78 | 78.46 | 89.66 | 54.55 | 111.11 |
| 6 | 8.04 | 1.12 | 99.01 | 90.76 | 74.55 | 78.13 | 56.99 | 107.48 |
| 7 | 9.49 | 1.48 | 101.40 | 100.00 | 65.10 | 94.81 | 60.00 | 101.23 |
| 8 | 11.21 | 1.72 | 103.61 | 100.58 | 63.25 | 98.14 | 59.04 | 101.74 |
| 9 | 13.2 | 1.79 | 95.98 | 101.15 | 60.59 | 100.00 | 60.57 | 101.73 |
| 10 | 15.59 | 1.79 | 99.42 | 103.53 | 61.68 | 95.81 | 65.52 | 100.00 |

As shown in Tables 13 to 17, plasticizer resistance was negatively affected in examples W-15, W-16 and W-17, while examples W-18 (which employed a minor amount of a urethane/acrylic copolymer in the Thermal Overcoat Protective Coating C4) and W-19 (control) showed comparable, superior results.

Working Examples W-21 through W-23

These working examples differed in terms of the composition of the Thermal Overcoat Protective Coating C4. In working examples W-21 through W-23, minor amounts of binder were added to the composition. The direct thermal side of each sample was imaged using an Atlantek 400 printer (model number 400). The printer settings as well as the image or optical densities of the imaged samples before and after exposure to heat, heat and humidity, water, plasticizer, ethyl alcohol and imaging oil, are shown in Tables 18 to 20 below.

TABLE 18

| Atlantek Step | Energy (mJ/mm²) | Average OD$_{initial}$ | W-21-(Joncryl FC 284)-10%-(% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 160.00 | 160.00 | 100.00 | 100.00 | 120.00 | 120.00 |
| 2 | 4.14 | 0.05 | 133.33 | 160.00 | 120.00 | 100.00 | 120.00 | 150.00 |
| 3 | 4.88 | 0.09 | 122.22 | 80.00 | 50.00 | 77.78 | 100.00 | 111.11 |
| 4 | 5.79 | 0.28 | 51.85 | 38.71 | 46.67 | 57.14 | 40.00 | 95.83 |
| 5 | 6.81 | 0.55 | 58.00 | 59.65 | 70.18 | 78.57 | 47.37 | 105.45 |
| 6 | 8.04 | 0.99 | 81.73 | 76.77 | 75.49 | 82.80 | 60.87 | 105.71 |
| 7 | 9.49 | 1.36 | 96.97 | 92.14 | 97.10 | 93.38 | 79.20 | 107.75 |
| 8 | 11.21 | 1.65 | 101.82 | 98.80 | 99.40 | 96.95 | 82.72 | 104.17 |
| 9 | 13.2 | 1.77 | 100.56 | 100.00 | 101.14 | 99.44 | 88.57 | 102.25 |
| 10 | 15.59 | 1.76 | 100.00 | 101.15 | 102.87 | 100.57 | 96.59 | 101.70 |

TABLE 19

| Atlantek Step | Energy (mJ/mm²) | Average OD$_{initial}$ | W-22-R9000-10%-(% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 160.00 | 160.00 | 120.00 | 120.00 | 140.00 | 120.00 |
| 2 | 4.14 | 0.05 | 160.00 | 140.00 | 100.00 | 100.00 | 140.00 | 120.00 |
| 3 | 4.88 | 0.08 | 128.57 | 87.50 | 55.56 | 77.78 | 100.00 | 100.00 |
| 4 | 5.79 | 0.24 | 60.00 | 43.48 | 40.00 | 55.17 | 47.83 | 87.50 |
| 5 | 6.81 | 0.48 | 50.00 | 45.83 | 63.27 | 92.73 | 48.94 | 115.56 |
| 6 | 8.04 | 0.86 | 72.50 | 71.60 | 76.34 | 92.31 | 60.47 | 106.90 |
| 7 | 9.49 | 1.23 | 85.00 | 90.68 | 95.93 | 100.00 | 71.31 | 101.54 |
| 8 | 11.21 | 1.56 | 99.35 | 95.51 | 96.88 | 101.96 | 77.42 | 103.75 |
| 9 | 13.2 | 1.72 | 101.75 | 100.00 | 100.00 | 101.17 | 88.24 | 102.30 |
| 10 | 15.59 | 1.75 | 99.43 | 101.15 | 101.73 | 103.45 | 91.48 | 101.14 |

TABLE 20

| Atlantek Step | Energy (mJ/mm²) | Average OD$_{initial}$ | W-23-R9000-10%-(% Image Retention after testing) | | | | | |
|---|---|---|---|---|---|---|---|---|
| | | | 60° C. | 90% RH | W-R | Plast.-R | Et.-R | I-Oil-R |
| 1 | 3.22 | 0.05 | 160.00 | 160.00 | 100.00 | 100.00 | 140.00 | 120.00 |
| 2 | 4.14 | 0.05 | 160.00 | 160.00 | 100.00 | 100.00 | 140.00 | 120.00 |
| 3 | 4.88 | 0.10 | 100.00 | 88.89 | 75.00 | 77.78 | 77.78 | 83.33 |
| 4 | 5.79 | 0.27 | 55.56 | 36.67 | 42.31 | 62.50 | 41.38 | 92.86 |
| 5 | 6.81 | 0.56 | 56.36 | 58.49 | 69.49 | 90.74 | 52.63 | 101.72 |
| 6 | 8.04 | 0.96 | 80.00 | 76.67 | 80.21 | 86.32 | 65.63 | 104.95 |
| 7 | 9.49 | 1.31 | 96.95 | 93.39 | 90.30 | 101.54 | 74.81 | 110.29 |
| 8 | 11.21 | 1.62 | 101.24 | 101.23 | 98.77 | 100.61 | 82.50 | 105.52 |
| 9 | 13.2 | 1.75 | 100.58 | 100.56 | 100.00 | 101.14 | 89.08 | 102.30 |
| 10 | 15.59 | 1.76 | 98.29 | 101.70 | 99.44 | 101.69 | 93.75 | 101.72 |

As shown in Tables 18 to 20, examples W-21 to W-23 demonstrate improved water and alcohol resistance in addition to improved plasticizer resistance. As such, these samples constitute a further improvement to example W-18.

As is evidence from the above working examples, further modifications to the thermal or heat sensitive layer, thermal overcoat protective layer, and HP Indigo receptive layer are possible and well within the scope of the present invention. So, while various embodiments of the inventive multi-layer sheet material 10, 18, have been described herein, it should be understood that they have been presented by way of example only, and not limitation. By way of further example, additional layers may be applied on the backside of base substrate 12, 20, resulting in, for example, the following systems:

(A) HP Indigo receptive layer//thermal layer//base substrate//HP Indigo receptive, flexographic, or offset printable layer;

(B) HP Indigo receptive layer//thermal layer//base substrate//thermal layer//HP Indigo receptive layer; and (C) HP Indigo receptive layer//thermal layer//base substrate//thermal layer. The thermal layers in systems (B) and (C) may image in the same or different colors. The direct thermal and HP Indigo layers may also be positioned on opposing sides of the base substrate. Thus, the breadth and scope of the present invention should not be limited by any of the exemplary embodiments.

What is claimed is:

1. A multi-layer sheet material, which comprises:
   (a) a base substrate;
   (b) optionally, one or more undercoat layers;
   (c) one or more thermal layers;
   (d) one or more thermal overcoat layers; and
   (e) one or more layers receptive to inks used in digital offset printing presses, wherein the multi-layer sheet material is imageable by both direct thermal printing devices and digital offset printing presses, wherein the one or more thermal overcoat layers is prepared from an aqueous coating formulation comprising: a blend of modified polyvinyl alcohol and urethane resins and/or urethane/acrylic copolymers; inorganic pigments; from about 0.2 to about 5% by dry weight, based on the total dry weight of the coating formulation, of one or more crosslinking agents, defoaming agents and surfactants; from about 2 to about 14% by dry weight, based on the total dry weight of the coating formulation, of one or more lubricants and waxes, wherein the ratio of resin to pigment ranges from about 5:1 to about 1:3.

2. The multi-layer sheet material of claim 1, wherein the blend comprises modified polyvinyl alcohol and urethane resins.

3. The multi-layer sheet material of claim 2, wherein the blend further comprises at least one of urethane/acrylic copolymers and acrylic polymers.

4. A multi-layer sheet material, which comprises:
(a) a base substrate;
(b) optionally, one or more undercoat layers;
(c) one or more thermal layers;
(d) one or more thermal overcoat layers; and
(e) one or more layers receptive to inks used in digital offset printing presses, wherein the multi-layer sheet material is imageable by both direct thermal printing devices and digital offset printing presses, wherein the one or more thermal undercoat layers is prepared from an aqueous coating formulation comprising: organic hollow particles; oil absorbing pigments; from about 5 to about 40% by dry weight, based on the total dry solids weight of the formulation, of one or more binders; and additives selected from the group of defoaming agents, fluorescent whitening agents, rheology modifiers and wetting agents, wherein the dry weight ratio of pigments to organic hollow particles ranges from about 10:1 to about 1:10.

* * * * *